United States Patent [19]

Tutt

[11] Patent Number: 5,375,535
[45] Date of Patent: Dec. 27, 1994

[54] METHOD AND APPARATUS FOR IMPROVED MANUFACTURE OF CEMENT IN LONG KILNS

[75] Inventor: James R. Tutt, Nash, Tex.

[73] Assignees: Ash Grove Cement Company, Overland Park, Kans.; Cadence Environmental Energy, Inc., Michigan City, Ind.

[21] Appl. No.: 2,958

[22] Filed: Jan. 11, 1993

[51] Int. Cl.⁵ ................................................. C04B 2/10
[52] U.S. Cl. .................................... 106/761; 106/752; 106/762
[58] Field of Search ............... 106/745, 752, 756, 761, 106/762, 768, 771

[56] References Cited

U.S. PATENT DOCUMENTS

| | | |
|---|---|---|
| 3,507,482 | 4/1970 | Kraszewski et al. . |
| 3,865,541 | 2/1975 | Wilson et al. . |
| 3,888,621 | 6/1975 | Williams . |
| 3,916,806 | 11/1975 | Giraud . |
| 4,123,332 | 10/1978 | Rotter . |
| 4,126,471 | 1/1978 | Herchenbach et al. ............ 106/752 |
| 4,249,890 | 2/1981 | Graham . |
| 4,276,092 | 6/1981 | St. John et al. . |
| 4,286,993 | 9/1981 | Louichi et al. ...................... 106/762 |
| 4,329,180 | 3/1982 | Herchenbach et al. ............ 106/762 |
| 4,541,346 | 9/1985 | Culliford . |
| 4,583,468 | 4/1986 | Reed et al. . |
| 4,850,290 | 7/1989 | Benoit et al. . |
| 4,930,965 | 6/1990 | Peterson et al. . |
| 4,974,529 | 12/1990 | Benoit et al. . |
| 5,073,107 | 12/1991 | Lask . |
| 5,078,594 | 1/1992 | Tutt et al. . |
| 5,083,516 | 1/1992 | Benoit et al. . |
| 5,100,314 | 3/1992 | Rierson . |

FOREIGN PATENT DOCUMENTS 0455301  11/1991  European Pat. Off. .
90/02915  3/1990  WIPO .

OTHER PUBLICATIONS

Walter H. Duda, "Cement-Data-Book—International Process Engineering in the Cement Industry", Bauverlag GmbH, 1976, pp. 329-336, pp. 423-424, and p. 293.

Primary Examiner—Karl Group
Assistant Examiner—Michael Marcheschi
Attorney, Agent, or Firm—Barnes & Thornburg

[57] ABSTRACT

A bypass system is provided for a long cement kiln. The long cement kiln includes a cylindrical rotary vessel in which a kiln gas stream flows countercurrent to in-process mineral. The bypass system includes an annular bypass plenum, a port in the wall of the rotary vessel in gas flow communication with said plenum, and a draft tube for preventing passage of in-process mineral through said port. A blower fan induces flow of at least a portion of the kiln gas stream to form a bypass stream through the draft tube and the port and into the annular bypass plenum. The bypass system also includes an apparatus for mixing controlled amounts of ambient air with the bypass stream to cool the kiln gas bypass stream and to precipitate alkali fume in the kiln gas bypass stream before it passes through the draft tube and the port in the wall of the rotary vessel to reduce build up of condensed alkali inside the draft tube.

24 Claims, 3 Drawing Sheets

METHOD AND APPARATUS FOR IMPROVED MANUFACTURE OF CEMENT IN LONG KILNS

BACKGROUND AND SUMMARY OF THE INVENTION

This invention relates to improvements in the operation and configuration of long rotary cement kilns. More particularly it is directed to a method and apparatus for enhancing the capacity and efficiency of cement clinker production in conventional wet or dry process long rotary kilns. A portion of the kiln gases is withdrawn from the rotary vessel at a point upstream, relative to kiln gas flow, of the mineral drying zone and pre-heating zone to form a kiln gas bypass stream.

In the widely used commercial process for the manufacture of cement, the steps of drying, calcining, and clinkering cement raw materials are accomplished by passing finely divided raw materials, including calcareous minerals, silica and alumina, through a heated, inclined rotary vessel or kiln. In what is known as conventional long dry or wet process kilns the entire mineral heating process is conducted in a heated rotating kiln cylinder, commonly referred to as a "rotary vessel." The rotary vessel is typically 12 to 15 feet in diameter and 400-700 feet in length and is inclined so that as the vessel is rotated, raw materials fed into the upper end of the kiln cylinder move under the influence of gravity toward the lower "fired" end where the final clinkering process takes place and where the product cement clinker is discharged for cooling and subsequent processing. Gas temperatures in the fired clinkering zone of the kiln range from about 1300° to about 1600° C. Kiln gas temperatures are as low as about 250° to 350° C. at the upper mineral receiving end of so-called wet process kilns. Somewhat higher gas temperatures exist in the upper end of long dry process kilns.

Generally, skilled practitioners consider the cement making process within the rotary kiln to occur in several stages as the raw material flows from the cooler gas exit mineral feed end to the fired/clinker exit lower end of the rotary kiln vessel. As the mineral material moves down the length of the kiln it is subjected to increasing kiln gas temperatures. Thus in the upper portion of the kiln cylinder where the kiln gas temperatures are the lowest, the in-process mineral materials first undergo a drying process and thereafter move into the hotter calcining zone and finally into the portion of the kiln where the kiln gas temperatures are the hottest, the clinkering zone adjacent to the fired lower end of the kiln cylinder. The kiln gas stream flows counter to the flow of in-process mineral materials from the clinkering zone, through the intermediate calcining zone and the mineral drying zone and out the upper gas exit end of the kiln into the kiln dust collection system. The flow of kiln gases through the kiln can be controlled to some extent by a draft induction fan positioned in the kiln gas exhaust stream.

The drying/pre-heat zone of a long process kiln is defined as that part of the kiln in which sufficient heat transfer takes place from the kiln gas stream to the mineral bed to eliminate moisture from the mineral raw material feed. In the drying zone, the mineral material is heated to a temperature of up to approximately 1500° F., the temperature at which mineral carbonates begin to calcine (release carbon dioxide). To facilitate the transfer of heat in the drying/pre-heat zone, chain curtains are provided. As mineral material is introduced and travels down the length of the drying zone, the chains continually rotate between the hot kiln gas phase and the mineral material phase transferring heat from the gases to the raw materials.

One of the shortcomings of the use of conventional long kilns for cement manufacture derives from the significant quantities of dust generated in the drying zone of the kiln and carried out of the kiln in the kiln gas stream. On the average about 7-10% (but as high as about 17%) of the raw material feed on a dry basis is blown back from the drying zone as dust. The high dust loss associated with the manufacture of cement clinker in long wet or dry process kilns places long kiln operators at a significant economic disadvantage relative to cement manufacturers using the newer pre-heater/pre-calciner kilns. High dust loss not only means loss of efficiency of use of raw materials—dust recovery is limited because of contamination by volatile alkali salts—but it also requires greater capital investment in dust collection equipment and loss of energy efficiency. Every ton of raw material lost as dust consumes significant amounts of heat energy during drying. Further the long kiln operator is burden by the cost of handling/disposal of waste dust.

Another disadvantage suffered by cement manufacture in conventional long kilns relative to that in pre-heater/pre-calciner kilns derives from the internal cycling of volatile alkali salts. As the in-process mineral travels down the kiln to the hotter zones, alkali salts such as potassium and sodium sulfates in the mineral are volatilized into the kiln gas stream and carried as an alkali fume into the coolest zones of the kiln, including particularly the dust generating drying zone where the alkali fume condenses on the dust and either falls back into the in-process mineral bed or is carried out of the kiln in the kiln gas stream and collected with the kiln dust in the dust collection system. It is the presence of the significant quantities of condensed alkali salts in the kiln dust that prohibits the return of the dust to the process—adding the alkaline dust to the mineral raw material can disrupt the alkali salt recirculation equilibrium and cause unacceptably high alkalinity in the cement product.

During cement kiln operation there is significant recirculation of alkali salts from the mineral bed to the kiln gas stream and back to the mineral bed. At equilibrium conditions where the alkali salts are carried out of the kiln at the same rate at which they are introduced in fuels and raw materials, it is estimated that there is 90% trapping of the volatilized alkali. The internal cycling of high quantities of alkali salts during kiln operation constitutes a significant energy burden on the process. Large quantities of high grade heat in the hotter zones of the kiln (where the heat is needed most) are lost to alkali volatilization only to be returned to the process as low grade heat during condensation in the lower temperature zones where excess heat is not needed. The configuration of pre-heater/pre-calciner kilns allows facile installation of alkali bypass conduits through which a portion of the alkali fume-laden kiln gas stream can be withdrawn before it becomes contaminated with entrained kiln dust, thereby not only reducing the alkali load in the internal cycle, but also providing means for recovery of a product highly enriched in the volatile alkaline salts. Until recently, there has been no means for establishing an alkali bypass for conventional long wet or dry process kilns.

There are many existing long kiln cement manufacturing operations, not only in the United States but in many other countries as well around the world. A method/apparatus for reducing dust loss and for enhancing control of the internal alkali cycling in long kiln cement manufacturing operations is disclosed in copending U.S. patent application Ser. No. 07/913,587, now abandoned, which is incorporated herein by reference. The invention disclosed in the '587 application enables long kiln operators to be more economically competitive with pre-heater/pre-calciner kiln operators.

The '587 application discloses modifying the kiln to allow withdrawal of a portion of the kiln gases from the rotary vessel at a point upstream, relative to kiln gas flow, of the mineral drying zone. By removing a portion of the kiln gas from the calcining zone, or more particularly from a point upstream, relative to kiln gas flow, of the mineral drying zone (most particularly the chain curtain section) and downstream of the hottest portions of the calcining zone, there is achieved a substantial reduction in dust generated and lost from the drying zone. Reduced dust loss derives not only from reduced kiln gas velocities in the drying zone, but also from the resultant extension of the drying zone itself. Removing a portion of the hot kiln gas stream results in an extended drying zone—the raw feed will have a greater moisture content through the chain curtain section of the kiln, effectively reducing the generation of dust in the drying zone.

Preferably the bypass is designed to withdraw at least about 10% of the hot kiln gases at a point upstream of the mineral drying/pre-heat zone. The bypass gases are cooled, for example, by mixing with ambient air and either returned to the kiln gas stream upstream of the kiln dust collection system, including for example, an electrostatic precipitator, or directed to an independent dust collection system.

A 10% reduction of kiln gas flowing through the drying zone is expected to result in an average velocity reduction in the drying zone of about 20% by the combined action of reduced mass and temperature. With that velocity reduction, the amount of dust blown by the gas stream out the upper gas exit end of the kiln will decrease significantly. The reduced dust loss allows an associated reduction in the amount of raw material for the same amount of clinker production. Of course, reduced dust loss also means less dust requiring disposal by the kiln operator and less of a dust load on the dust collection system.

A shortcoming associated with the bypass system disclosed in the '587 is that condensed alkali tends to build up inside bypass inlet tube as the kiln gas cools in the inlet tub. An air cannon is used periodically during kiln operation to clear condensed alkali from the port and the bypass inlet tube during kiln operation without perturbation of the on-going cement manufacturing process. An industrial 8-gauge shotgun utilizing No. 4 zinc shot can be substituted for air cannon or used in combination therewith to clear condensed alkali from port and bypass inlet tube.

An object of the present invention is to reduce or prevent buildup of condensed alkali inside a bypass inlet tube of a long kiln bypass system.

According to one aspect of the present invention, an improved design for bypass apparatus is provided for use with a long cement kiln. The long cement kiln comprises a cylindrical rotary vessel in which a kiln gas stream flows countercurrent to in-process mineral. The bypass apparatus comprises an annular bypass plenum, a port in the wall of the rotary vessel in gas flow communication with said plenum, means for preventing passage of in-process mineral through said port, and means for inducing flow of at least a portion of the kiln gas stream to form a bypass stream through said port and into the annular bypass plenum. The improvement of the present invention comprises means for mixing controlled amounts of ambient air with said bypass stream before it passes through said port in the wall of the rotary vessel.

The means for preventing passage of in-process mineral through the port includes a draft tube having a first end communicating with the port and a second end communicating with the kiln gas stream. The means for mixing ambient air with the bypass stream includes means for delivering ambient air to the second end of the draft tube. The ambient air delivery means includes an air conduit for directing ambient air to the second end of the draft tube and means for controlling ambient air flow through said conduit.

The air conduit is in gas flow communication with at least a portion of an annular space defined by the outer surface of the rotary vessel and a sealing sleeve mounted on the rotary vessel in axial alignment with the port. The portion of the annular space in gas flow communication with the air conduit is further in gas flow communication with a windbox comprising an annular plenum and the means for controlling air flow into the air conduit includes a variable speed fan in air flow communication with the annular plenum of the windbox.

In the illustrated embodiment, the air conduit for directing ambient air to the second end of the draft tube comprises an annular channel defined by the draft tube and a draft tube sleeve surrounding the draft tube. The draft tube sleeve extends into the rotary vessel beyond the second end of the draft tube. The draft tube sleeve includes a radially inwardly extending flange having an upturned lip for deflecting ambient air toward the second end of the draft tube.

According to another aspect of the present invention, a method is provided for enhancing the capacity and efficiency of clinker production of an operating conventional wet or dry long rotary kiln. The kiln comprises a rotary vessel having a fired lower end and an adjacent clinkering zone, an upper gas exit end and an adjacent mineral drying zone, and an intermediate calcining zone along its length and a kiln gas stream flowing from the clinkering zone through the intermediate calcining zone and mineral drying zone out the gas exit end to a kiln dust collection system. The method comprises the steps of withdrawing a portion of the kiln gases through a port formed in a wall of the rotary vessel at a point upstream, relative to kiln gas flow, of the mineral drying zone to form a kiln gas bypass stream, and mixing controlled amounts of ambient air with said kiln gas bypass stream to cool the kiln gas bypass stream and to precipitate alkali fume in the bypass stream before it passes through the port in the wall of the rotary vessel.

The method further includes the step of further cooling or quenching the gas bypass stream after the gas bypass stream passes through the port in the wall of the rotary vessel to cool said gas bypass stream to a predetermined operating temperature. The bypass stream is preferably further cooled (quenched) by its mixture with ambient air optionally in combination with a water spray after the kiln gas bypass stream passes through the port in the wall of the rotary vessel. The illustrated method further includes the steps of collecting at least a portion of precipitated alkali fume from the cooled gas bypass stream and recombining the quenched kiln gas bypass stream with the kiln gases upstream, relative to kiln gas flow, of the kiln dust collection system.

According to yet another aspect of the present invention, an apparatus is provided for enhancing the capacity and efficiency of clinker production of a conventional wet or dry long rotary kiln. The kiln comprises a rotating vessel having a fired lower end and an adjacent clinkering zone, an upper kiln gas exit end and an adjacent mineral drying zone, and an intermediate calcining zone along its length and a kiln gas stream flowing from the clinkering zone through the intermediate calcining zone and upper mineral drying zone to a kiln dust collection system. The apparatus includes a port formed in the rotary vessel at a point upstream, relative to kiln gas flow, of the mineral drying zone. The apparatus also includes a draft tube for preventing passage of in-process mineral through the port. The draft tube has a first end communicating with the port and a second end communicating with the kiln gas stream. The apparatus further includes an annular plenum in alignment with the port axially along the length of the rotary vessel, in gas flow communication with said port and having located thereon an air inlet damper valve. The apparatus still further includes means for creating reduced pressure in said annular plenum to draw air into said air inlet and to withdraw at least a portion of the kiln gas stream through the draft tube to form a kiln gas bypass stream which passes into said annular plenum. In addition, the apparatus includes means for mixing controlled amounts of ambient air with said the kiln gas bypass stream before it enters the second end of the draft tube to cool the kiln gas bypass stream ant to precipitate alkali fume in the kiln gas bypass stream before it enters the second end of the draft tube to reduce build up of condensed alkali inside the draft tube.

According to a further aspect of the invention, an apparatus is provided for enhancing the capacity and efficiency of clinker production of a conventional wet or dry long rotary kiln. The kiln in operation comprises a rotary vessel having a fired lower end and an adjacent clinkering zone, an upper kiln gas exit end and an adjacent mineral drying zone, and an intermediate mineral calcining zone along its length and a kiln gas stream flowing from the clinkering zone through the intermediate calcining zone and upper mineral drying zone to a kiln dust collection system. The apparatus includes a solid fuel charging port and a gas bypass port formed in the rotary vessel. The fuel charging port is located at a point along the length of the vessel wherein fuel charged through the port will enter the calcining zone. The bypass port is located at a point on the vessel downstream, relative to kiln gas flow, from said fuel charging port. The apparatus also includes means for preventing in-process mineral from passing through each of said fuel charging and bypass ports, and an annular plenum in alignment with the bypass port axially along the length of the rotary vessel and in gas flow communication with said bypass port. The apparatus further includes means for creating reduced pressure in said annular plenum to withdraw at least a portion of the kiln gas stream through the bypass port and into said annular plenum to form a kiln gas bypass stream, and means cooperating with the charging port for charging solid fuel into the calcining zone. The apparatus still further includes means for mixing controlled amounts of ambient air with said bypass stream to quench the kiln gas stream to precipitate alkali fume in the bypass stream before it passes through the bypass port in the wall of the rotary vessel.

According to a still further aspect of the invention, an apparatus is provided for enhancing the capacity and efficiency of clinker production of a conventional wet or dry long rotary kiln. The kiln comprises a rotating vessel having a fired lower end and an adjacent clinkering zone, an upper kiln gas exit end and an adjacent mineral drying zone, and an intermediate calcining zone along its length and a kiln gas stream flowing from the clinkering zone through the intermediate calcining zone and upper mineral drying zone to a kiln dust collection system. The apparatus of the present invention includes a port formed in a wall of the rotary vessel. The port is located axially between the calcining zone and the mineral drying zone. The apparatus also includes a sealing sleeve mounted on the rotary vessel in axial alignment with the port. The sealing sleeve defines an annular space between an outer surface of the rotary vessel and the sealing sleeve. The sealing sleeve is formed to include an aperture therein. A draft tube has a first end which is coupled to the aperture formed in the sealing sleeve. The draft tube extends through the port and into the rotary vessel a predetermined distance which is longer than the maximum depth of in-process mineral in the rotary vessel. The draft tube has a second end in communication with the kiln gas stream. A first annular plenum is located in axial alignment with the port and the aperture in the sealing sleeve. The first annular plenum is in gas flow communication with the port and the aperture in the sealing sleeve. A blower fan is coupled to the first annular plenum for creating reduced pressure in the first annular plenum to withdraw at least a portion of the kiln gas stream through the draft tube and into the first annular plenum to form a kiln gas bypass stream. The apparatus further includes a draft tube sleeve having a first end coupled to the port in the rotary vessel. The draft tube sleeve extends into the rotary vessel and surrounds the draft tube to define an annular channel therebetween for directing ambient air to the second end of the draft tube. The apparatus still further includes a windbox having a second annular plenum in gas flow communication with the annular space between the outer surface of the rotary vessel and the sealing sleeve. In addition, the apparatus includes means for controlling ambient air flow through the second annular plenum, through the annular space between the outer surface of the rotary vessel, and through the annular channel between the draft tube sleeve and the draft tube to mix controlled amounts of ambient air with said kiln gas bypass stream before it enters the second end of the draft tube to cool the kiln gas bypass stream and to precipitate alkali fume in the kiln gas bypass stream before it enters the draft tube to reduce build up of condensed alkali inside the draft tube.

Use of the present bypass apparatus of the present invention in long kilns provides multiple advantages to the cement manufacturing process. The operation of the present bypass system will allow the drying zone of the kiln to operate somewhat independently of the rest of the process. The energy demands of the calcining process are such that more than sufficient energy remains at the process boundary between the calcining and drying/pre-heating zones to accomplish the drying/pre-heating step. By rerouting a portion of the kiln gas around the drying/pre-heating zone through the bypass duct, the amount of energy supplied to the drying/pre-heating zone will more closely match the process requirements of this zone. Consequently, the volume of gases passing through this zone will be reduced, thereby resulting in lower gas velocity. The lower velocity will in turn reduce the amount of in-process material that will be entrained in the kiln gas stream and exit the kiln as cement kiln dust. The reduced velocity of the gas stream in the drying zone during operation of the bypass system results in a 40–75% reduction of kiln dust lost from the kiln, thereby resulting in increased process economy.

Pieces of chain are suspended in the drying/pre-heating zone as an internal heat exchange device. The suspended chains also trap some of the volatile salts (e.g., $K_2SO_4$) in the process until equilibrium is reached and an internal cycle of volatile constituents is established in which these constituents leave the process at the same rate at which they are introduced in fuels and raw materials. An internal cycle of alkali salts can cause operating problems such as the buildup of material rings in the kiln. By rerouting a portion of the hot kiln gas containing the gaseous volatile constituents around the chain system, the magnitude of the internal cycle will be reduced, thus improving kiln operation. During operation of the bypass, "bypass gas" will be extracted prior to the gas entering the turbulence of the chain system. As a result, it is expected that there will be little suspended particulate matter in this bypass gas; however, the hot bypass gas will contain the alkali fume and other volatilized components—one target of the bypass arrangement. When the bypass gas stream is recombined with the exit gas from the drying/pre-heating zone of the kiln prior to its entry into the air pollution control (dust collection) system, the thermal energy in the bypass gas ensures that the temperature of the gas is above the dew point even if the kiln exit gas itself is at or below the dew point.

Under 40 C.F.R. 266.104(g), monitoring of CO and THC in a bypass duct is allowed as a means of complying with CO and THC limits, provided that: (1) hazardous waste is fired only into the kiln and not at any location downstream from the kiln exit relative to the direction of gas flow (i.e., downstream from the bypass); and (2) the bypass diverts a minimum of 10% of the kiln off-gas into the duct. The preamble to the BIF regulation (56 F.R. 7159, Feb. 21, 1991) acknowledges that a rationale for allowing monitoring in a bypass duct is that a bypass would preclude the interference of non-fuel THC emissions from raw materials. In long kilns, the raw material is heated in the drying/pre-heating zone to a temperature sufficient to evaporate the hydrocarbons contained therein. The hydrocarbons from that heating process are contained in the kiln exit gases. The bypass duct will draw gas from the kiln prior to its entry into the drying/pre-heating zone; therefore, gases will not have been affected by the raw material heating process. Thus, the monitoring of the bypass gases is a true representation of the gases from the combustion process without interference from hydrocarbons in the raw material.

The present invention also enables enhanced clinker production capacity in long kilns. There are two limiting factors in the production of cement in long wet process kilns: (1) the kiln gas velocity in the drying zone causing dust loss; and (2) thermal loading in the sintering zone. Inherently these factors work to limit the amount of heat energy that can be delivered into the kiln for transfer for the in-process mineral. The impact of the first of those limiting factors can be minimized by use of the present bypass apparatus. Subject to the limitations imposed by factor (2) above, the bypass apparatus can be used to reduce kiln gas stream velocities in the drying zone even with significantly higher energy input into the process.

It has recently been reported in the art that conventional long kilns can be modified to provide an environmentally safe and economically advantageous use of solid waste fuels. Apparatus and methods for delivering solid fuels, especially solid waste fuels, are known in the art. See, for example, U.S. Pat. Nos. 4,930,965, 4,969,407, 4,850,290, 5,078,594 and 5,083,516. The delivery of solid fuel into the calcining zone in accordance with the teachings of those patents tends to increase the temperature of the kiln gas stream, and concomitantly kiln gas stream velocity, through the drying zone with potential enhanced dust loss. The present long kiln bypass method and apparatus can be utilized in conjunction with use of the art-recognized methods and apparatus for burning combustible solids, particularly combustible waste solids, as supplemental fuel in long kilns.

Additional features and advantages of the invention will become apparent to those skilled in the art upon consideration of the following detailed description of the preferred embodiments exemplifying the best mode of carrying out the invention.

DETAILED DESCRIPTION OF THE INVENTION

Figure 1:
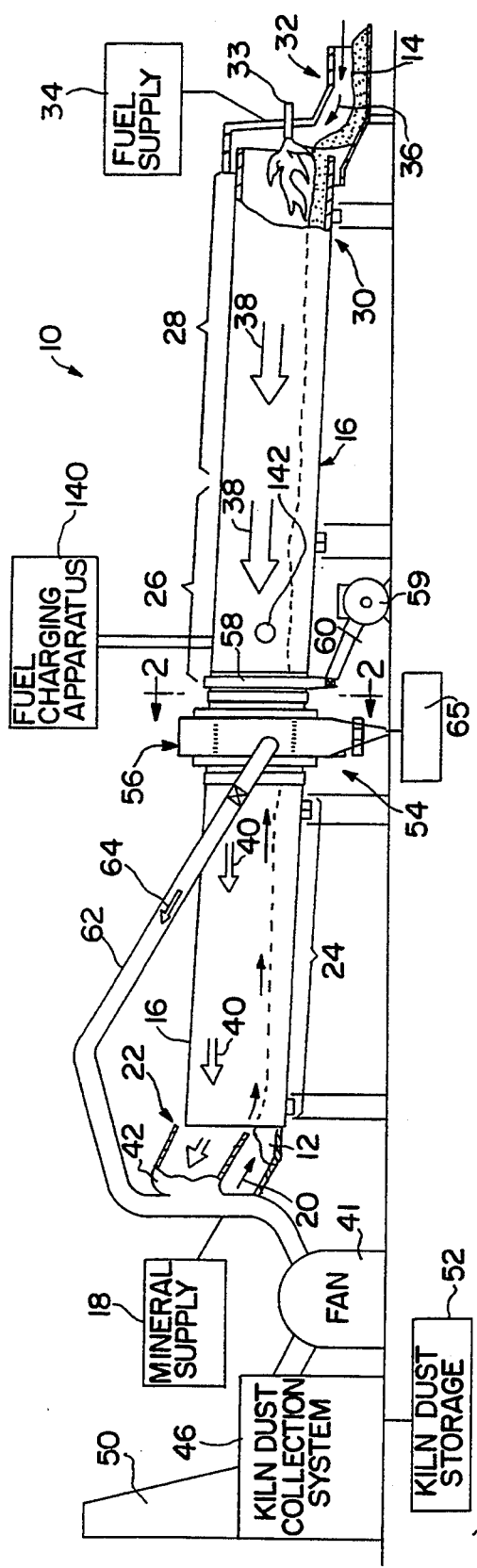
FIG. 1 is a diagrammatic view of an improved long rotary kiln in accordance with the present invention showing mineral flow in a downhill direction through the drying, calcining and clinkering zones in a rotary vessel, hot kiln gas flow in an uphill direction in the rotary vessel, a kiln gas bypass for withdrawing a portion of the hot kiln gases through a draft tube to produce a kiln gas bypass stream, and a windbox located adjacent the kiln gas bypass for supplying primary quench air to a primary quench tube to a draft tube sleeve to quench the hot kiln gas bypass stream before it passes through the draft tube.

An improved long rotary kiln 10 for converting mineral materials 12 into cement clinker 14 is illustrated in FIG. 1. The kiln 10 includes an inclined rotary vessel 16 and means (not shown) for rotating the rotary vessel 16 about its longitudinal axis. Mineral materials 12 from mineral supply 18 are charged into mineral inlet 20 at upper end 22 of the rotary vessel 16. As rotary vessel 16 is rotated, mineral materials 12 move under the influence of gravity through a mineral drying/pre-heat zone 24, a calcining zone 26 and a clinkering zone 28 before being discharged as cement clinker 14 from lower end 30 of rotary vessel 16 into cooling chamber 32.

Fuel from fuel supply 34 is combined with combustion air 36 pre-heated as it is drawn through cooling chamber 32 and burned using burner 33 in the clinkering zone 28 of rotary vessel 16. A chain system or the like (not shown) is used to improve the efficiency of heat transfer from the hot kiln gases flowing through the mineral drying/pre-heat zone 24 to the mineral materials 12. The chains are exposed to the hot kiln gases and deliver heat to the mineral bed 12 during rotation of rotary vessel 16. The hot kiln gas stream illustrated by arrows 38 and 40 generated by fuel combustion at burner 33 in clinkering zone 28 flows toward upper end 22 of rotary vessel 16 under influence of negative pressure created by fan 41. The kiln gas stream 40, after exiting upper end 22 of rotary vessel 16 is directed to kiln dust collection system 46 including an electrostatic precipitator or other suitable gas cleaning system to separate kiln dust into dust storage 52 and an environmentally acceptable air stream delivered into the atmosphere through stack 50.

The configuration of the elements of the mineral feed components and the kiln gas processing components at the upper end 22 of rotary vessel 16 are well known those skilled in the art and it should be appreciated that such elements are shown diagrammatically in FIG. 1 to illustrate their relationship and cooperation in operation of rotary kiln 10. It will be understood that any of a wide variety of mineral loading and kiln gas handling systems may be incorporated into the kilns modified in accordance with the present invention.

Further with reference to FIG. 1, a kiln gas bypass system 54 is provided for withdrawing a portion of the kiln gas stream from rotary vessel 16 during kiln operation to produce a kiln gas bypass stream 64 which is delivered through bypass conduit 62 to the kiln gas stream in kiln gas exhaust conduit 42 after the gas stream exits the upper end 22 of rotary vessel 16. Bypass system 54 includes a venting apparatus 56 in gas flow communication with the kiln gas stream 38 in rotary vessel 16 and with bypass conduit 62. Venting apparatus 56 is located at a point along the axial length of rotary vessel 16 upstream, relative to kiln gas flow, of the mineral drying/pre-heat zone 24. It can be located a point in alignment with the calcining zone 26 or more preferably at a point corresponding to the downstream (relative to kiln gas flow) end portion of the calcining zone 26. The venting apparatus 56 can be located on the rotary vessel 16 at a point intermediate between the chain system (not shown) in mineral drying zone 24 and a downstream portion of the calcining zone 26. The preferred location of the venting apparatus can be stated alternatively as between the chain system (not shown) in the mineral drying zone 24 and the middle of rotary vessel 16—functionally between the chain system of the mineral drying zone 24 and the hottest portions of the calcining zone 26. Most preferably, the venting apparatus 56 is located at a point on the rotary vessel that is about one kiln diameter upstream relative to kiln gas flow, of the chain system in the mineral drying zone 24.

In operation kiln bypass system 54 is utilized to withdraw a portion of the kiln gas stream from rotary vessel 16 to reduce the velocity (and mass) of kiln gases flowing through the mineral drying zone 24 thereby reducing the amount of dust that is discharged from upper end 22 of rotary vessel 16 during kiln operation. The bypass gas stream 64 is returned to the kiln gas stream at a point downstream of the mineral drying zone 24 and upstream of the kiln dust collection system 46. The resultant reduced kiln gas velocities in mineral drying zone 24 effects a significant reduction in dust lost during cement manufacture. The reduced dust loss enhances the efficiency of cement clinker production not only by decreasing the raw material/clinker production ratio but concomitantly allows for enhanced energy/fuel efficiency.

Bypass system 54 also includes a windbox 58 located adjacent venting apparatus 56. As discussed below in detail windbox 58 delivers a supply of primary quench air to venting apparatus 56 to quench the kiln gas stream before the kiln gas stream is withdrawn from rotary vessel 16. Ambient air is supplied to windbox 58 by fan 59 through conduit 60 coupled to windbox 58.

The formation of a bypass stream from an operating long wet or dry process rotary kiln in accordance with the present invention offers multiple advantages to the cement making process. Firstly, as mentioned above, formation of the bypass stream reduces the mass/velocity of kiln gases traversing the mineral drying zone 24. That works in at least two ways to reduce dust lost. It reduces the amount of energy delivered to the drying zone thereby extending the drying zone in the chain system—the more moisture retained by the mineral in the chain system, the less the tendency of the drying mineral to produce dust. Further, and perhaps more directly, the formation of a bypass stream upstream of the drying zone 24 reduces the velocity of the kiln gas stream flowing through the drying zone and concomitantly reduces its ability to carry dust out the upper gas exit end of the operating kiln.

Further, the formation of a bypass stream can be used to regulate the temperature of kiln gas stream exiting the upper end 22 of the rotary vessel. The bypass system of the present invention can also be used to remove alkali from the cement making process. Alkali components are volatilized in the calcining and clinkering zones of the kiln. Without use of the bypass system alkali components volatilized into the kiln gas stream condense on the dust particles in the kiln drying zone and either fall back into the mineral bed or contaminate the kiln dust blown out of the kiln by the kiln gas stream to the extent that it cannot be added back to supplement the mineral material for the cement making process. The bypass system allows the kiln operator not only to reduce dust lost, but as well, to reduce the alkali content of the dust that exits the back of the kiln that is produced during use of the bypass system. Further, the bypass stream can be processed to remove at least a portion of the alkali fume before it is returned to the kiln gas stream upstream of the kiln dust collection system. The high alkali dust isolated from the quenched bypass stream can be collected and used as a source of alkali (potassium, sodium and other volatile metal salts).

Figure 2:
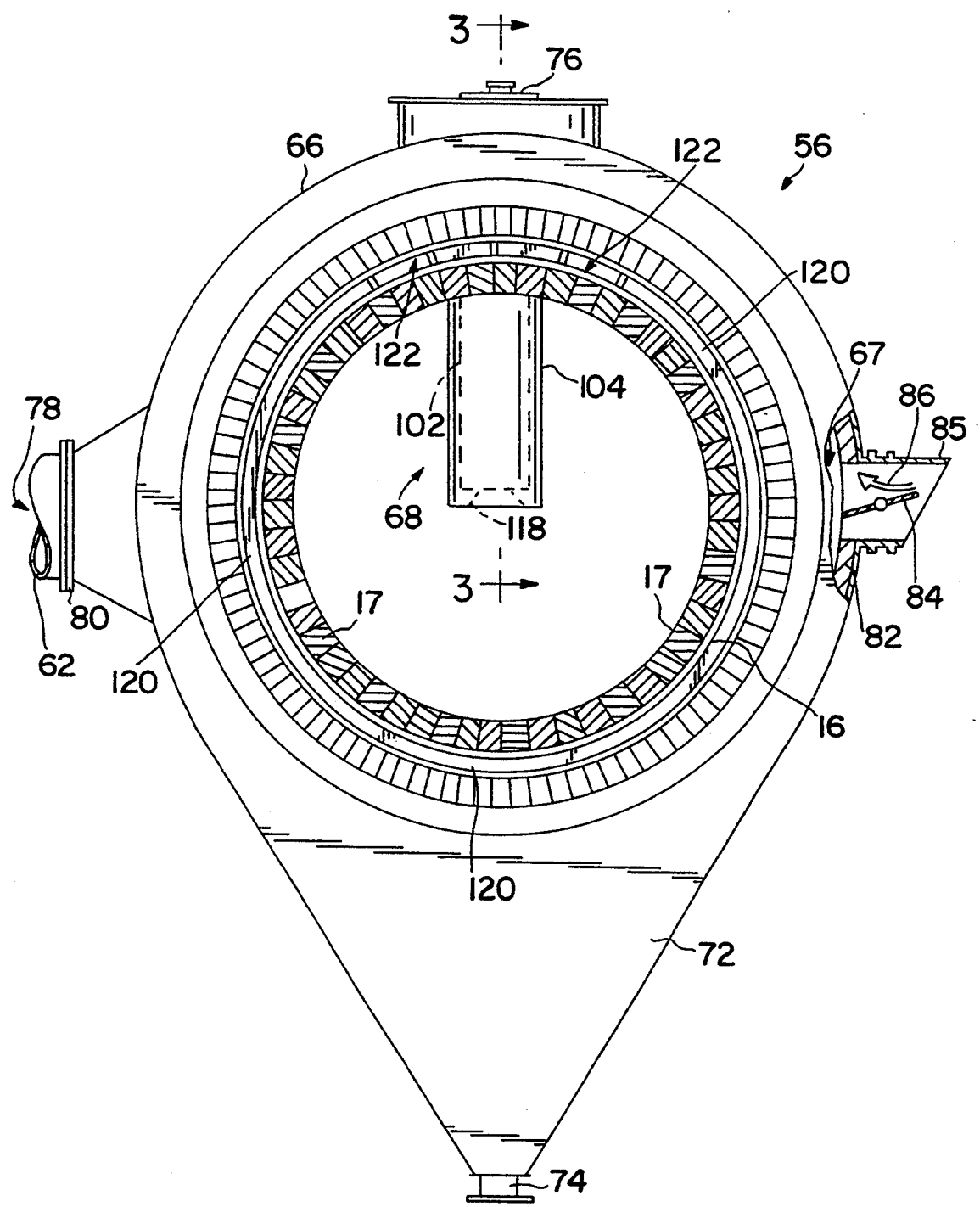
FIG. 2 is a sectional view taken along lines 2—2 of FIG. 1 illustrating a preferred embodiment of a venting apparatus component of this invention with portions broken away.
Figure 3:
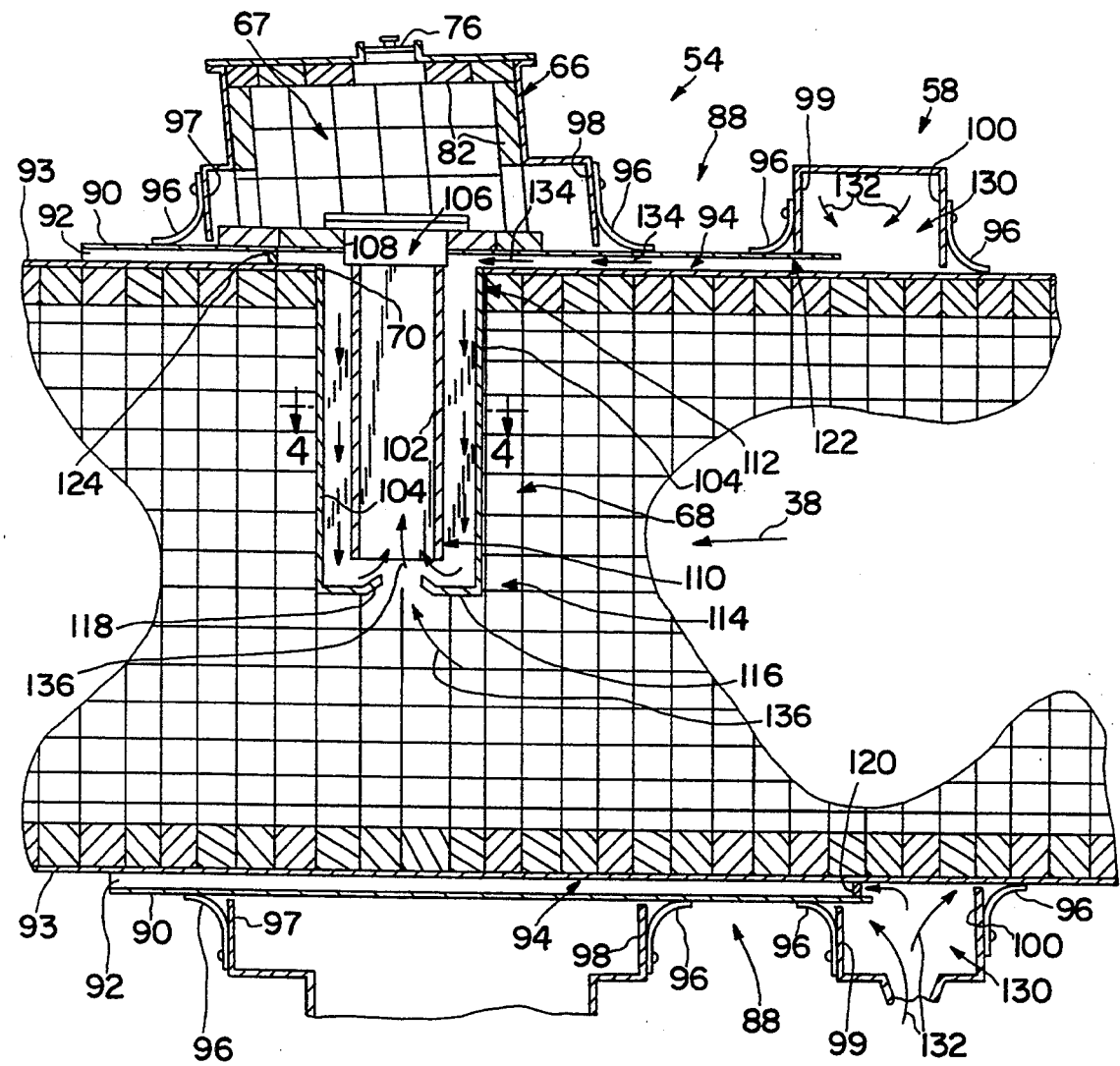
FIG. 3 is a sectional view taken along lines 3—3 of FIG. 2 illustrating the interface of an annular bypass plenum and the windbox with the rotary kiln vessel.

FIGS. 2 and 3 illustrate a preferred bypass system 54 in accordance with this invention located on a rotary vessel 16 to enable formation of a kiln bypass stream by withdrawal of a portion of the kiln gas stream at a point upstream of the mineral drying zone during kiln operation. Venting apparatus 56 is located axially on rotary vessel 16 to enable withdrawal of about 10% to about 35% of the kiln gas stream at a point upstream of the mineral drying zone during kiln operation. Venting apparatus 56 includes a refractory-lined plenum 66 in gas flow communication with the inside of rotary vessel (having refractory liner 17) through bypass inlet tube assembly 68 and bypass port 70 (FIG. 6) in rotary vessel 16 16. Annular plenum 66 is extended in its lower portion to form a dust collection funnel 72 for directing kiln dust into conduit 74 through double tipping valve (not shown) and flexible boot (not shown) into a dust collector 65 illustrated diagrammatically in FIG. 1. Annular plenum 66 is provided with a sealable service hatch 76 to permit access to bypass port 70 and bypass inlet tube assembly 68 for cleaning or repair. Bypass inlet tube assembly 68 extends into rotary cylinder 16 from port 70 to prevent loss of mineral material 12 through port 70. The length of the bypass inlet tube assembly 68 is preferably selected to be the minimum length necessary to assure that the tube penetrates the load to prevent escape of in-process mineral through the port 70 during kiln rotation.

Annular plenum 66 is provided with bypass gas exit 78 having plenum isolation damper 80 for controlling gas flow communication between plenum 66 and bypass conduit 62. Plenum 66 is lined with refractory 82 and formed to include air damper valve 84 to allow secondary kiln-gas-quenching air to enter plenum 66 through conduit 85 in the direction of arrow 86. Air damper valve 86 is located on plenum 66 diametrically opposed to bypass gas exit 78 to optimize quenching of kiln gases exiting vessel 16 into annular plenum 66. A kiln gas bypass stream is formed by withdrawing at least a portion of the kiln gas stream in rotary vessel 16 through bypass inlet tube assembly 68 and port 70 and into the annular plenum 66 under the influence of a negative pressure (relative to that in rotary vessel 16) induced by bypass fan 41. Hot bypass stream 64 mixes with ambient air inside interior region 67 of annular plenum 66. Ambient air is drawn through air damper valve 84 under the influence of negative pressure from bypass fan 41. Valve 84 is operated manually or automatically to control ambient air flowing into air conduit 85 in the direction of arrow 86. Therefore, a secondary quench of the kiln bypass stream is provided through conduit 85 in communication with interior region 67 of annular plenum 66. The secondary quench further reduces the temperature of the bypass stream to a predetermined operating temperature.

Conduit 85 and damper valve 84 are preferably sized so that the ratio of the volume of ambient air flowing through conduit 85 to the volume of gas bypass stream is about 1:1 to about 5:1, the lower ratios (and thus higher bypass gas temperatures) being preferred to keep the volume of the bypass stream to a minimum. Air damper valve 84 and bypass fan 41 can be controlled to adjust the ratio of ambient air to the bypass gas stream.

The ambient air-quenched gas bypass stream can be processed to remove at least a portion of the alkali fume precipitated from the bypass stream before the bypass stream is returned to the kiln gas stream. The extent of quenching is dictated principally by the operating temperature limits of the materials used for construction of the bypass system and the need to control the condensation of the volatile alkali components of the bypass stream. If a bypass fan is required (it is optional where fan 41 is capable of inducing sufficient bypass flow through the venting apparatus and bypass conduits), the bypass temperature is usually limited by the operating temperature limits for the fan. Typically, industrial fans specified for this type of operation have a maximum operating temperature of about 800° F., but fans having a higher maximum operating temperature are available at much greater capital cost. Typically there will be a certain amount of air in leakage (and quenching) in the annular plenum due to the inherent air leakage characteristic of the seal between the plenum and the rotary vessel.

Air infiltration at the interface of the annular plenum 66 and windbox 59 with rotating vessel 16 is controlled by use of a sealing system 88 best shown in FIG. 3. Sealing system 88 includes a sealing sleeve 90 supported by spacers 92 on the surface 93 of rotary vessel 16 to define an open annular air space 94 which allows radiant and convective cooling of the axial portion of the surface 93 of rotary vessel 16. Sealing system 88 further comprises leaf seals 96 which are mounted on opposite lateral edges 97 and 98 of annular plenum 66 and on opposite lateral edges 99 and 100 of windbox 59 in wiping/sealing contact with sealing sleeve 90. Leaf seals 96 can be formed of one or more overlapping layers of stainless steel or mild steel leaves.

A shortcoming associated with the bypass system disclosed in copending U.S. patent application Ser. No. 07/913,587, now abandoned, which is incorporated herein by reference is that condensed alkali tends to build up inside bypass inlet tube as the kiln gas cools in the inlet tube. In the bypass system disclosed in the '587 application, an air cannon is used periodically during kiln operation to clear condensed alkali from the port and the bypass inlet tube during kiln operation without perturbation of the on-going cement manufacturing process. An industrial 8-gauge shotgun utilizing No. 4 zinc shot can be substituted for air cannon or used in combination therewith to clear condensed alkali from port 93 and bypass inlet tube 94. The present invention advantageously reduces buildup inside the inlet tube and therefore eliminates the need for an air cannon.

Figure 4:
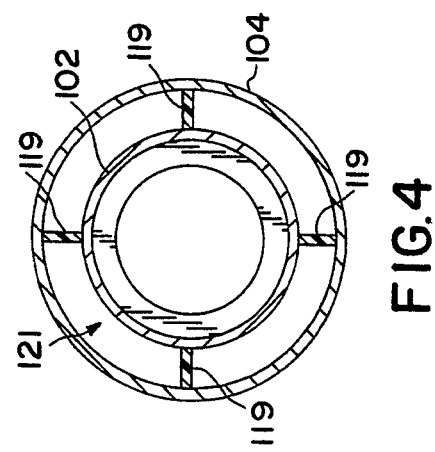
FIG. 4 is a sectional view taken along lines 4—4 of FIG. 3 illustrating the configuration of the draft tube located within the draft tube sleeve.

Operation of bypass system 54 is best illustrated in FIGS. 2-5. With reference to FIG. 3, bypass inlet tube assembly 68 includes a draft tube 102 and a draft tube sleeve or primary air quench tube 104 which surrounds draft tube 102. Draft tube 102 includes a first end 106 coupled to an aperture 108 formed in sealing sleeve 90. Therefore, the open first end 106 of draft tube 104 is in communication with interior region 67 of annular plenum 66. A second end 110 of draft tube 102 extends into the rotary vessel 16 and is in communication with kiln gas flowing through rotary vessel 16 in the direction of arrow 38. A first end 112 of primary air quench tube 104 is coupled to aperture 70 formed in outer wall of rotary vessel 16. A second end 114 of primary air quench tube 104 extends below second end 110 of draft tube 102. Second end 114 of primary air quench tube 104 includes a radially inwardly extending flange 116. Flange 116 has an upturned lip 118 which deflects air toward open second end 110 of draft tube 102 as explained below. As illustrated in FIG. 4, a plurality of ribs 119 are coupled between draft tube 102 and primary air quench tube 104 to provide support therebetween. An annular air flow channel 121 is defined between draft tube 102 and primary air quench tube 104.

As rotary vessel 16 rotates, annular plenum 66 and windbox 58 remain stationary. Leaf seals 96 engage sealing sleeve 90 to prevent air from passing from annular plenum 66 and windbox 59 to the atmosphere. As best illustrated in FIGS. 2 and 3, air flow between windbox 59 and annular plenum 66 is blocked throughout most of the circumference of rotary vessel 16. A barrier 120 best illustrated in FIG. 2 blocks air flow between windbox 58 and annular plenum 66. Barrier 120 extends substantially around the entire circumference of rotary vessel 16. However, a portion of open annular air space 94 adjacent bypass inlet tube assembly 68 is not blocked by barrier 120 to permit air flow between windbox 58 and annular channel 121 of draft tube assembly 68 through an air flow channel 122.

Figure 5:
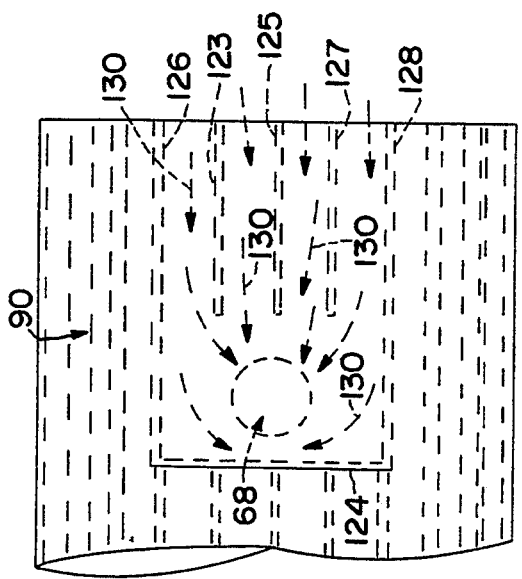
FIG. 5 is a top elevational view of a portion of the rotary kiln vessel illustrating air flow between the windbox and the primary quench tube.

FIG. 5 illustrates air flow channel 122 surrounding bypass inlet tube assembly 68. A barrier 124 is provided to block air flow beyond barrier 124 inside air flow channel 122. Air flow channel 122 is therefore defined between barrier 124 and supports 126 and 128. Center supports 123, 125 and 127 are spaced apart from barrier 124 to permit air flow between supports 126 and 128 in the area adjacent draft tube assembly 68.

In operation, the primary quench air is supplied to interior region 130 of windbox 58 through conduit 60 by fan 59. Illustratively, fan 59 is driven by a motor having a variable frequency drive. Primary quench air enters interior region 130 of windbox 58 in the direction of arrows 132. Primary quench air is blocked by barrier 120 throughout most of the circumference of rotary vessel 16. However, primary quench air flows through air flow channel 122 in the direction of arrows 134. Barrier 124 blocks air flow within air flow channel 122 as discussed above. Primary quench air then flows through annular channel 121 defined between draft tube 102 and primary air quench tube 104 toward the second ends 110 and 114 of draft tube 102 and primary air quench tube 104, respectively. Kiln gas is drawn through open end 114 of primary air quench tube 104 and through open end 110 of draft tube 102 in the direction of arrows 136 to form a kiln gas bypass stream. Primary quench air is deflected toward open end 110 of draft tube 12 by upturned lip 118 of flange 116. Therefore, the primary quench air mixes with the kiln gas bypass stream as the bypass stream is drawn into open end 110 of draft tube 102. Kiln gases are drawn into open end 110 of draft tube 102 by negative pressure in interior region 67 of annular plenum 66 caused by fan 41.

In the previous bypass system disclosed in the '587 application, volatile constituents present in the kiln gas stream condense upon the interior side wall of the draft tube. It is known that this solid material will continue to grow within the inside dimension of the draft tube until the tube is completely closed such that a condition of zero flow through the tube is achieved.

Once kiln gases are cooled below a predetermined temperature, the liquid phase of the volatiles solidifies. Because bypass system 54 of the present invention mixes controlled amounts of ambient air with the kiln gas bypass stream before it enters draft tube 102, an initial quench of the kiln gas bypass stream is provided to form a mobile dispersion of precipitated alkali in the bypass stream. Therefore, the volatile constituents do not stick to the interior side wall of draft tube 102. The present invention cools the kiln gases prior to withdrawing the kiln gases through draft tube 102 to substantially reduce buildup of solids in the draft tube. Ambient air introduced into windbox 58 is substantially cooler than the kiln gases flowing through rotary vessel 16. The primary quench air is directed through air flow channel 22 and through annular channel 121 defined between draft tube 102 and primary air quench tube 104. The primary air is introduced to the draft tube 102 concurrent with the entrance of hot kiln gases so that a primary quench of hot kiln gases is achieved at the point of entry of draft tube 102. Preferably the bypass gas should be quenched in the annular plenum to a temperature of less than about 950° F. to minimize build up of condensed alkali salts.

Travel of primary quench air through annular channel 121 also provides cooling air contact with all outer surface of a side wall of draft tube 102 and with the inner surface of a side wall of quench tube 104. This increases the life cycle of draft tube 102 and quench tube 104.

As shown diagrammatically in FIG. 1, in one preferred embodiment of the present invention, a solid fuel charging apparatus 140 is provided for charging solid fuel or the like into the calcining zone 26 or in downstream portions of the clinkering zone 28 through port 142 in the rotary vessel 16. Methods and apparatus for modification of long kilns for burning solid fuels, preferably solid waste derived fuel as supplemental fuel in operating cement kilns is described in U.S. Pat. Nos. 4,930,965, issued Jun. 5, 1990; 5,078,594, issued Jan. 7, 1992; and 5,083,516, issued Jan. 28, 1992, which patents are expressly incorporated herein by reference. Use of the bypass for long kilns in accordance with the present invention can be used in combination with the methods and apparatus described and claimed in those patents to provide optimum control and efficiency of cement manufacture in long wet or dry process kilns. Indeed, it is anticipated that use of the presently described bypass technology in conjunction with the recently developed technology for burning solid waste derived combustibles as supplemental fuel for long kilns will not only allow long kiln operators to extend the operating life of their long kilns but as well enable them to continue to compete favorably in the market place with cement manufacturers using more fuel efficient pre-heater/pre-calcining facilities.

Construction of the bypass and its associated components, including particularly bypass inlet tube 102, annular plenum 66, and primary quench tube 104 should be of materials which will withstand the thermally harsh conditions inherent in operation of the bypass. The temperature of the kiln gas adjacent inlet tube assembly 68 can be as high as 1800° F. Thus, bypass inlet tube 102 and primary quench tube 104 are typically constructed using high temperature resistant alloy materials. Plenum 66 is constructed of hot rolled steel and lined with castable refractory. Leaf seals 96 on annular plenum 66 and windbox 58 should be capable of maintaining sealing engagement with the annular sealing sleeve 90 mounted on rotary vessel 16 during kiln operation. Seals 96 can be constructed, for example, of graphite, capable of maintaining sealing engagement with the annular sealing sleeve 90 during rotation of rotary vessel 16.

Use of the venting apparatus of the present invention to enable enhanced control of the kiln gas stream in long wet or dry process cement kilns offers many advantages to the kiln operator, not only in terms of reduced dust loss and alkali volatiles management, but as well in the profound benefits of the enhanced clinker production capacity and enhanced energy and raw material utilization efficiency. There is a significant economic incentive for long kiln modification in accordance with this invention. Yet as illustrated hereinabove and co-pending U.S. application Ser. No. 07/913,587, now abandoned, which has been incorporated by reference, there are multiple variations in the use and processing of the bypass stream itself—even without regard to the alternatives for additional enhanced efficiencies through utilization of mid-kiln firing and tertiary air injection. It is understood that the improved bypass design of the present invention may be used with other bypass arrangements illustrated in the '587 patent application or elsewhere.

Although the invention has been described defined in detail with reference to certain preferred embodiments, variations and modifications exist within the scope and spirit of the invention as described and claimed in the following claims.

What is claimed is:

1. A method for enhancing the capacity and efficiency of clinker production of an operating conventional wet or dry long rotary kiln, said kiln comprising a rotary vessel having a fired lower end and an adjacent clinkering zone, an upper gas exit end and an adjacent mineral drying zone, and an intermediate calcining zone along its length and a kiln gas stream flowing from the clinkering zone through the intermediate calcining zone and mineral drying zone out the gas exit end to a kiln dust collection system, said method comprising the steps of:

withdrawing a portion of the kiln gases through a port formed in a wall of the rotary vessel at a point upstream, relative to kiln gas flow, of the mineral drying zone to form a kiln gas bypass stream;

mixing ambient air with said kiln gas bypass stream to cool the kiln gas bypass stream and to precipitate alkali fume in the bypass stream before it passes through the port in the wall of the rotary vessel and further quenching the gas bypass stream after the gas bypass stream passes through the port in the wall of the rotary vessel to cool said gas bypass stream to an operating temperature.

2. The method of claim 1, further comprising the step of collecting precipitated alkali fume from the cooled gas bypass stream.

3. The method of claim 1, further comprising the step of recombining the quenched kiln gas bypass stream with the kiln gases upstream, relative to kiln gas flow, of the kiln dust collection system.

4. The method of claim 1, wherein the step of quenching the gas bypass stream is achieved by dilution of the bypass stream with ambient air.

5. The method of claim 1, wherein the port in the rotary vessel is located at a point downstream, relative to kiln gas flow, of the hottest portion of calcining zone.

6. The method of claim 1, further comprising the step of charging solid fuel into the calcining zone through a second port in the rotary vessel.

7. The method of claim 6, wherein the solid fuel is sol id waste.

8. The method of claim 1, wherein at least 10% of the total kiln gas stream is withdrawn to form the kiln gas bypass stream.

9. A method for enhancing the capacity and efficiency of clinker production of an operating conventional wet or dry long rotary kiln, said kiln comprising a rotary vessel having a fired lower end and an adjacent clinkering zone, an upper gas exit end and an adjacent drying zone, an intermediate calcining zone along its length, a kiln gas stream flowing from the fired lower end to the upper gas exit end, and a port formed in a wall of the rotary vessel between the drying zone and the clinkering zone, and an annular plenum surrounding the kiln in gas flow communication with the port, the method comprising the steps of:

withdrawing a portion of the kiln gas stream through a draft tube having a first end coupled to the kiln to provide gas flow through the port and into the plenum and a second end situated within the rotary vessel draw a kiln bypass stream therethrough;

supplying ambient air to the second end of the draft tube;

mixing ambient air with the kiln gas bypass stream at the second end of the draft tube to quench the kiln gas bypass stream and to precipitate alkali fume in the bypass stream before the kiln gas bypass stream enters the draft tube and further quenching the gas bypass stream after the gas bypass passes through the port in the wall and into the annular plenum to cool said gas bypass stream to an operating temperature.

10. The method of claim 9, further comprising the step of collecting at least a portion of precipitated alkali fume from the cooled gas bypass stream.

11. The method of claim 9, further comprising the step of recombining the quenched kiln gas bypass stream with the kiln gases upstream, relative to kiln gas flow, of the kiln dust collection system.

12. The method of claim 9, wherein the step of quenching the gas bypass stream is achieved by dilution of the bypass stream with ambient air.

13. The method of claim 9, wherein the port in the rotary vessel is located at a point downstream, relative to kiln gas flow, of the hottest portion of calcining zone.

14. The method of claim 9, further comprising the step of charging solid fuel into the calcining zone through a second port in the rotary vessel.

15. The method of claim 14, wherein the solid fuel is solid waste.

16. The method of claims 9, wherein at least 10% of the total kiln gas stream is withdrawn to form the kiln gas bypass stream.

17. A method for enhancing the capacity and efficiency of clinker production of an operating conventional wet or dry long rotary kiln, said kiln comprising a rotary vessel having a fired lower end and an adjacent clinkering zone, an upper gas exit end and an adjacent mineral drying zone, and an intermediate calcining zone along its length and a kiln gas stream flowing from the clinkering zone through the intermediate calcining zone and mineral drying zone out the gas exit end to a kiln dust collection system, said method comprising the steps of:

withdrawing a portion of the kiln gases through a port formed in a wall of the rotary vessel to form a Kiln gas bypass stream;

quenching the kiln gas bypass stream to cool the kiln gas bypass stream and to precipitate alkali fume in the bypass stream before the bypass stream passes through the port in the wall of the rotary vessel and further quenching the gas bypass stream after the gas bypass stream passes through the port in the wall and into the annular plenum to cool said gas bypass stream to an operating temperature.

18. The method of claim 17, further comprising the step of collecting at least a portion of precipitated alkali fume from the cooled gas bypass stream.

19. The method of claim 17, further comprising the step of recombining the quenched kiln gas bypass stream with the kiln gases upstream, relative to kiln gas flow, of the kiln dust collection system.

20. The method of claim 19, wherein the step of further quenching the gas bypass stream is achieved by dilution of the bypass stream with ambient air.

21. The method of claim 17, wherein the port in the rotary vessel is located at a point downstream, relative to kiln gas flow, of the hottest portion of calcining zone.

22. The method of claim 17, further comprising the step of charging solid fuel into the calcining zone through a second part in the rotary vessel.

23. The method of claim 17, wherein the solid fuel is solid waste.

24. The method of claim 22, wherein at least 10% of the total kiln gas stream is withdrawn to form the kiln gas bypass stream.

* * * * *